UNITED STATES PATENT OFFICE.

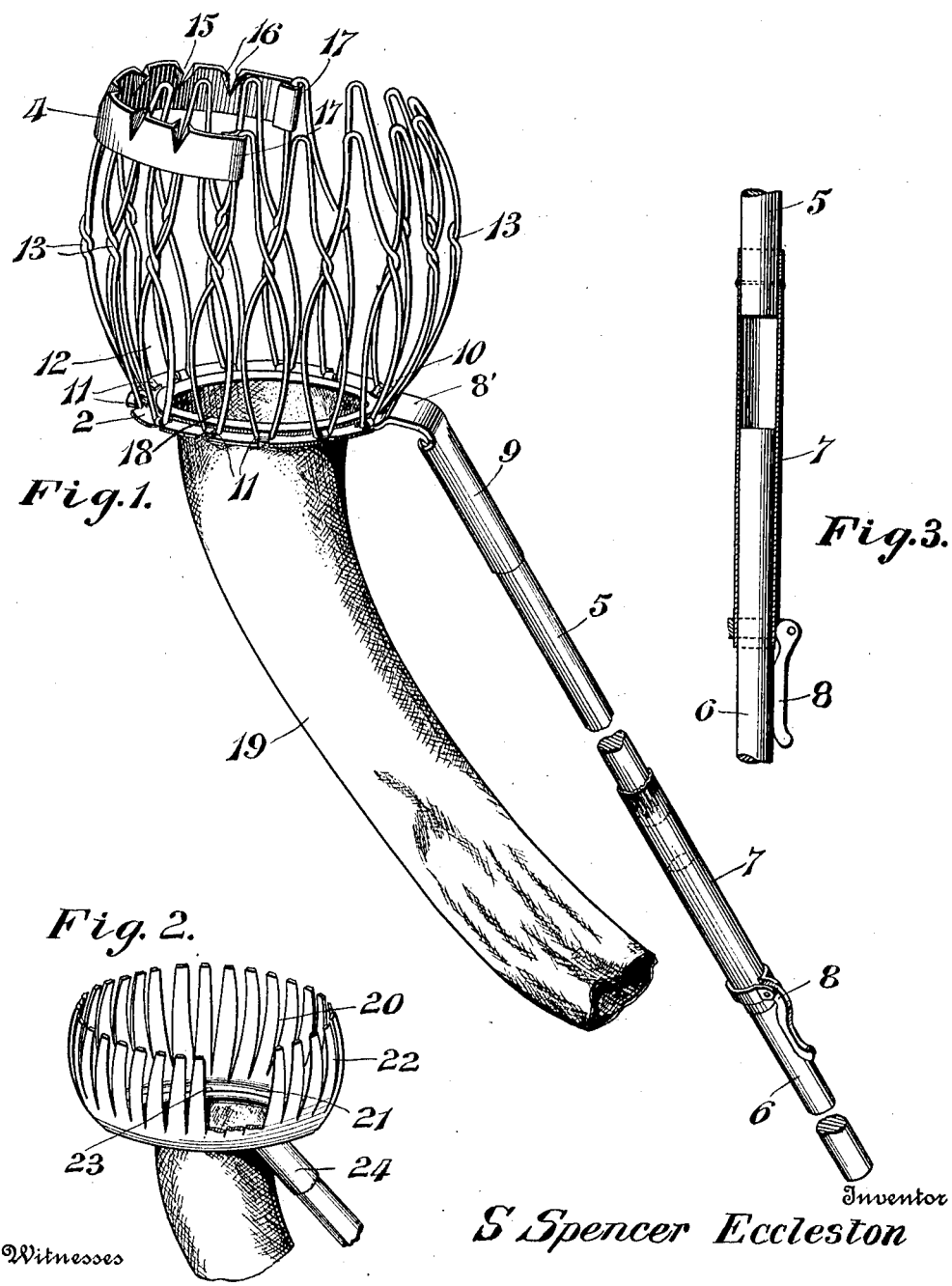

S SPENCER ECCLESTON, OF SYRACUSE, NEW YORK, ASSIGNOR TO MELVILLE A. CLARK, OF SYRACUSE, NEW YORK.

FRUIT-PICKER.

1,034,989.  Specification of Letters Patent.  Patented Aug. 6, 1912.

Application filed September 12, 1911. Serial No. 648,846.

*To all whom it may concern:*

Be it known that I, S SPENCER ECCLESTON, a citizen of the United States, residing at Syracuse, in the county of Onondaga and State of New York, have invented new and useful Improvements in Fruit-Pickers, of which the following is a specification.

This invention relates to fruit pickers, and has for an object to provide a device of this character which will include a gathering cage and a severing element, the latter being positioned above the former and being adapted to cut the stem of the fruit and thereby permit the same to be removed with the fruit so as to prevent the rapid decay of the fruit after the same is removed from the tree, it being understood that in picking over-ripe fruit the stems usually become detached from the fruit which causes a rapid decay of the same.

Another object of the invention is to provide a fruit picker wherein the basket will be disposed at such an angle with respect to the handle as to greatly facilitate the gathering of the fruit.

A still further object of the invention is to provide a conveying tube which will be positioned with respect to the discharge end of the collecting basket so as to allow the passage of the fruit therethrough without bruising the same.

In the drawing, forming a portion of this specification and in which like numerals of reference indicate similar parts in the several views:—Figure 1 is a perspective view of the fruit picker. Fig. 2 is a similar view of a slightly modified form of the same. Fig. 3 is a longitudinal section through a portion of the handle.

My improved fruit picker comprises a handle member 1, a head 2, a gathering cage 3, and a severing knife 4. The handle is constructed of the telescopic sections 5 and 6, the latter being slidably mounted on a corrugated sleeve 7 which is fitted to the upper section 5 of the handle. The section 6 is provided with a pivoted cam lever 8 which is adapted to be brought into engagement with the sleeve so as to securely hold the same in its adjusted position on the upper section 5.

The head 2 is substantially of circular configuration and is stamped from a single piece of sheet metal, and as illustrated, it is provided with a lateral extension 8 on which is formed a socket 9 which receives the upper section 5 of the handle. This head has stamped therefrom a circular series of tongues 10 with which the lower bight portions 11 of the yieldable cage loops 12 are securely engaged. The basket is constructed from a single length of wire, and as shown, the adjacent loops of the cage have their side portions intertwisted, at 13, so as to securely hold the loops in cage form. The knife 4 extends partly around the cage at the upper end thereof, being preferably arranged at such an angle so that the effective cutting portion of the knife is disposed immediately above the cage so as to facilitate the engagement of the knife with the stem of the fruit, causing the same to be severed from the tree and preventing the loss of the stem from the fruit when the latter is collected. The effective cutting surface of the knife is provided with an annular series of substantially V-slits 15, the walls of the slits being bent to lie in parallel relation to each other so as to form the companion cutting blades 16. The knife is provided with hooked ends 17 which are adapted to be securely clamped to the side arms of the loops 12 of the cage, as clearly shown in Fig. 1 of the drawing.

The head 2 is arranged substantially at an obtuse angle with respect to the handle so as to extend upwardly and outwardly therefrom when the handle is disposed vertically. When the handle is held upwardly and forwardly from the operator the cage and the head 2 are disposed horizontally so as to be correctly positioned beneath the fruit. A relatively large discharge opening 18 is formed in the head 2 and fitted in the opening is the upper end of a conveying tube 19. This tube may be extended downwardly against the side of the handle 1 of the device so that the lower end of the tube will be positioned in reach of the hand of the operator to enable him to collect the fruit as it is picked. If desired the fruit may be extended into a suitable receiving basket or receptacle, (not shown).

In the modified form of the invention shown in Fig. 2, the cage 20 is constructed from a single piece of metal which is provided with a head portion 21 and the yieldable portions 22. These portions extend upwardly from the head and are arranged in a circular series thereon, as shown. The head 19 is provided with a central discharge opening 23 and a handle attaching socket 24.

I claim:—

1. A fruit picker comprising a handle, a head mounted thereon, said head having stamped therefrom a circular series of tongues, a gathering cage comprising a single strand of wire supported by said head and fastened thereto by means of said tongues, a knife secured to said cage at the top edge thereof and extending partially around the same and having its cutting surface provided with an annular series of V-shaped cutting slits, the walls of said slits being bent to lie in spaced parallel relation one to the other to form companion cutting blades, and a discharge tube connected to said head.

2. A fruit picker comprising a handle, a head mounted thereon, said head having stamped therefrom a circular series of tongues, a gathering cage comprising a single strand of wire supported by said head and fastened thereto by means of said tongues, said wire being so bent to form yieldable cage loops, the adjacent loops of said cage having their side portions intertwisted to securely hold said loops in cage form, a knife secured to said cage at the top edge thereof and extending partially around the same and having its cutting surface provided with an annular series of V-shaped cutting slits, the walls of said slits being bent to lie in spaced parallel relation one to the other to form companion cutting blades, and a discharge tube connected to said head.

In testimony whereof I affix my signature in presence of two witnesses.

S SPENCER ECCLESTON.

Witnesses:
SHIRLEY CARTER,
R. G. POTTER.

---

Copies of this patent may be obtained for five cents each, by addressing the "Commissioner of Patents, Washington, D. C."